(12) United States Patent
Ye

(10) Patent No.: US 12,473,721 B2
(45) Date of Patent: Nov. 18, 2025

(54) AUTOMATIC FAUCET

(71) Applicant: AS America, Inc., Piscataway, NJ (US)

(72) Inventor: Xiaojing Ye, Edison, NJ (US)

(73) Assignee: AS America, Inc., Piscataway, NJ (US)

( * ) Notice: Subject to any disclaimer, the term of this patent is extended or adjusted under 35 U.S.C. 154(b) by 439 days.

(21) Appl. No.: 17/912,168

(22) PCT Filed: Mar. 22, 2021

(86) PCT No.: PCT/US2021/023458
§ 371 (c)(1),
(2) Date: Sep. 16, 2022

(87) PCT Pub. No.: WO2021/194958
PCT Pub. Date: Sep. 30, 2021

(65) Prior Publication Data
US 2023/0139701 A1    May 4, 2023

Related U.S. Application Data

(60) Provisional application No. 62/993,248, filed on Mar. 23, 2020.

(51) Int. Cl.
*E03C 1/05* (2006.01)
*E03C 1/04* (2006.01)

(52) U.S. Cl.
CPC .............. *E03C 1/057* (2013.01); *E03C 1/0404* (2013.01); *E03C 2001/0415* (2013.01)

(58) Field of Classification Search
CPC ........................................................ E03C 1/057
See application file for complete search history.

(56) References Cited

U.S. PATENT DOCUMENTS

| | | |
|---|---|---|
| 9,976,291 B2 | 5/2018 | Sawaski et al. |
| 10,550,555 B2 | 2/2020 | Chen |
| 10,557,254 B2 | 2/2020 | Song |
| 2006/0231782 A1 | 10/2006 | Iott et al. |
| 2009/0056011 A1* | 3/2009 | Wolf ................ E03C 1/057 4/623 |
| 2017/0051481 A1* | 2/2017 | Mercer ............. E03C 1/057 |
| 2017/0215655 A1* | 8/2017 | Ophardt .......... G06F 3/04842 |
| 2018/0016773 A1* | 1/2018 | Chandler ......... E03C 1/0404 |
| 2019/0063049 A1* | 2/2019 | Wang .............. F16K 37/0033 |
| 2019/0264427 A1 | 8/2019 | Chung |
| 2020/0209897 A1* | 7/2020 | Smith .............. E03C 1/057 |

FOREIGN PATENT DOCUMENTS

WO    WO2012067088 A1    5/2012

OTHER PUBLICATIONS

PCT/US2021/023458 International Search Report and Written Opinion dated Jun. 8, 2021.

* cited by examiner

*Primary Examiner* — Christine J Skubinna
(74) *Attorney, Agent, or Firm* — Rameshwar U. Patel; Anna-lisa L. Gallo; Tyler A. Stevenson

(57) ABSTRACT

A faucet assembly comprising a faucet body, a spout and a spray head, wherein the spray head comprises one or more detectors selected from a group consisting of time-of-flight sensors, camera sensors, image sensors, and time-of-flight camera sensors positioned on a face of the spray head, the spray head face defines a water flow path, and the one or more detectors are configured to recognize an item located in the water flow path.

20 Claims, 3 Drawing Sheets

AUTOMATIC FAUCET

BACKGROUND

Faucets are omnipresent plumbing fixtures having the capability to deliver hot water, cold water or a hot water/cold water mixture from a water source (e.g. tap or well water). "Hands-free" or "touchless" faucet systems that may be directed to deliver water without manually actuating the faucet exist. Existing touchless faucets require a hand to be placed in close proximity to the spout head or at a certain location is a faucet water flow path. Desired is an automatic faucet that is able to recognize between objects placed in a flow path and to direct water to the objects accordingly; for example, water for hand washing, water for tooth brushing, water for washing a dirty pan, etc.

SUMMARY

Accordingly, disclosed is a faucet assembly comprising a faucet body, a spout, and a spray head, wherein the spray head comprises one or more detectors selected from a group consisting of time-of-flight sensors, camera sensors, image sensors, and time-of-flight camera sensors positioned on a face of the spray head, the spray head face defines a water flow path, and the one or more sensors are configured to recognize an item located in the water flow path.

BRIEF DESCRIPTION OF THE DRAWINGS

The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

DETAILED DISCLOSURE

Figure 1:
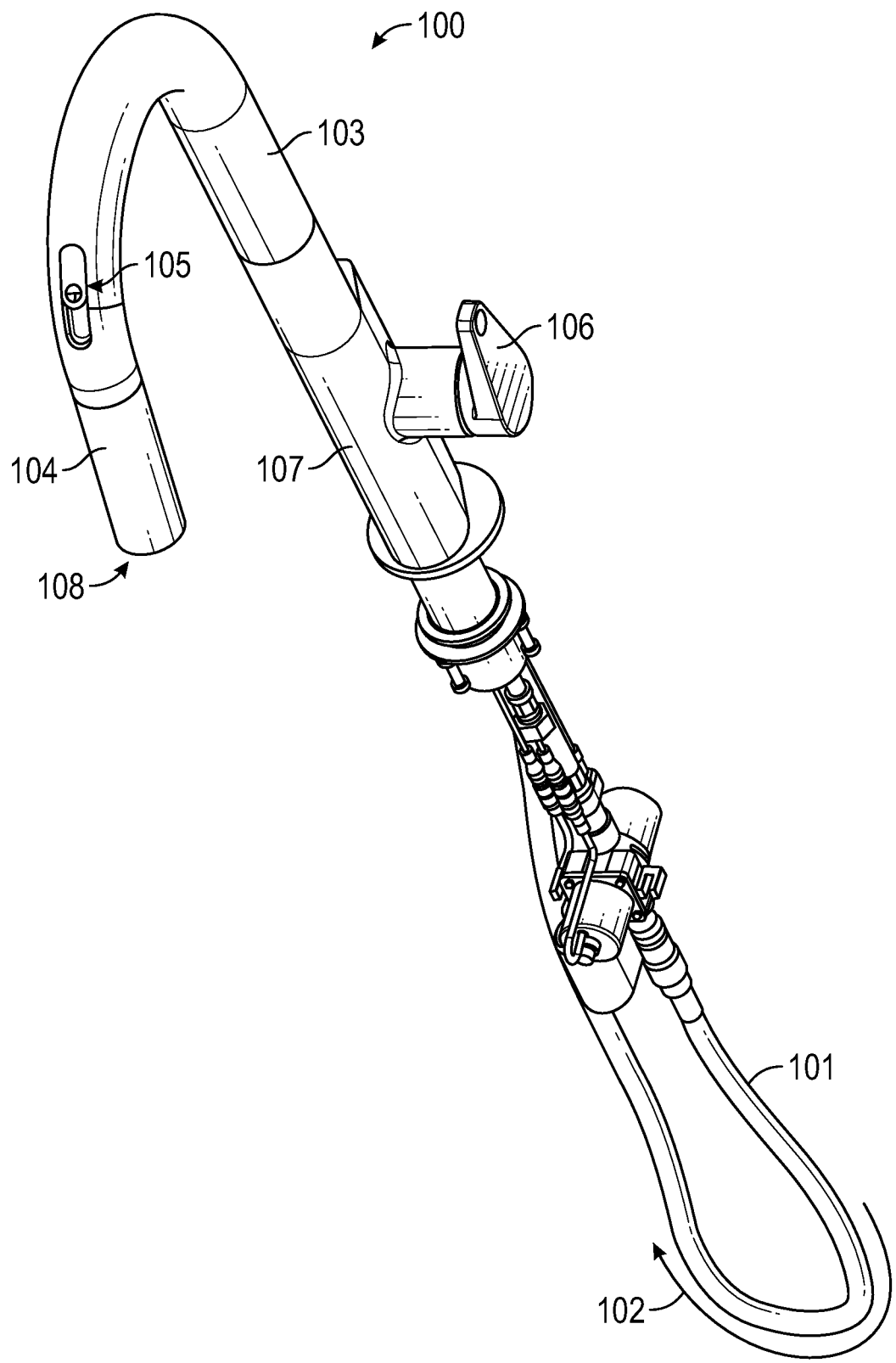
FIG. 1 depicts a pull-down faucet assembly, according to an embodiment.

A present faucet assembly may be a pull-down, pull-out or stationary assembly. The assembly comprises a faucet body, a spout, and a spray head. A pull-down or pull-out assembly may comprise a spray head in flow communication with a hose disposed in the spout. In some embodiments, a hose may be a multi-channel hose configured to supply for example treated or untreated water.

In some embodiments, treated water may comprise filtered water, ozone-infused water, NaOCl-infused water, electrolyzed water, or antimicrobial-infused water.

The spray head comprises one or more detectors selected from a group consisting of time-of-flight (TOF) sensors, camera sensors, image sensors, and TOF camera sensors positioned in or on the spray head face. The spray head face comprises one or more or a plurality of orifices or nozzles for dispensing and delivering water and defines a water flow path from the assembly. In some embodiments, a flow path may have a substantially cone-like shape starting from a spray head face increasing in size outward. An outer largest diameter of a cone-shaped flow path may extend beyond and have a larger diameter than a spray head face. In other embodiments, a flow path may have a substantially cylinder-like shape beginning at a spray head face.

In some embodiments, a sensor positioned on a spray head face may comprise a lens, which may be flush with a spray head face and essentially not visible from a side view. In some embodiments, a lens may recessed in or may extend from a spray head face.

In some embodiments, one or more detectors positioned in/on a spray head face may be configured to recognize an item placed in the water flow path. In some embodiments, one or more detectors are configured to recognize an item placed in a flow path when the item is from any of about 1 inch or less, about 2 inches, about 3 inches, about 4 inches, about 5 inches, about 6 inches, about 7 inches, about 8 inches, about 9 inches, about 10 inches, or about 11 inches, to any of about 12 inches, about 13 inches, about 14 inches, about 15 inches, about 16 inches, about 17 inches, about 18 inches, about 19 inches, about 20 inches, about 21 inches, about 22 inches, about 23 inches, about 24 inches, or more, from a spray head face.

In some embodiments, one or more detectors positioned in/on a spray head face are configured to recognize an item in a water flow path upon a spray head being pulled out from a spout and towards the item. In some embodiments, one or more detectors may be configured to recognize an item in a flow path when the item is from any of about 1 inch or less, about 2 inches, about 3 inches, or about 4 inches, to any of about 5 inches, about 6 inches, about 7 inches, about 8 inches, about 9 inches, about 10 inches, or more, from a spray head face.

In some embodiments, a faucet assembly is configured so that the spray head must be pulled out from the spout in order for the one or more detectors to recognize the item. In some embodiments, pulling a spray head away from a spout will activate a sensing system, which sensing system may otherwise be "asleep". A sensing system may comprise one or more detectors. A sensing system may comprise one or more detectors and a controller.

In some embodiments, two or more detectors may be positioned in/on a spray head face. In some embodiments, information from two or more detectors may be required to recognize and/or identify an item. In some embodiments, a controller is configured to compare and reconcile information from two or more detectors in order to confirm recognition and/or identity of an item. In some embodiments, a controller configured to compare and reconcile information from two or more detectors allows for an item to be moving relative to a flow path, for example, an item may be hand held and moving and not required to be absolutely stationary for recognition/identification of the item.

In some embodiments, a faucet assembly may comprise one or more detectors positioned on a spray head face, and one or more detectors on a faucet body. One or more detectors on a faucet body may be positioned above a faucet handle. In some embodiments, a controller is configured to compare a reconcile information from a sensor positioned on a spray head face and a sensor positioned on a faucet body.

In some embodiments, a controller may be configured to determine a 3 dimensional image of an item. A controller may be configured to remember an item by storing its information/identity. Accordingly, commonly used items, such as certain measuring cups, pots, plates, etc., may be more easily identified.

In an embodiment, a controller is configured to receive multiple signals from a combination of detectors, voice input, etc., and to compare them. A controller may contain logic such that comparison of information received from different detectors or sources must have a certain confidence threshold, for example about 50%, about 60%, about 70%, about 80%, about 90%, about 95%, or higher, in order to identify an item. The term "compare and reconcile" may mean analyzing data from different sources, comparing them, and if a comparison meets a certain confidence threshold, an item may be positively identified.

In some embodiments, recognition of an item may mean a determination that an item has been introduced to and/or is present in the flow path. Recognition of an item may mean a determination that an item has been removed from and/or is not present in the flow path. In some embodiments, the assembly is configured to initiate water flow and deliver water to an item introduced to and/or present in the flow path and/or to cease water flow and stop delivery of water when an item is removed from or not present in the flow path.

In some embodiments, recognition of an item may mean an identification of the item, for instance a pair of hands to be washed, a toothbrush to be rinsed, a dirty pot to be cleaned, a glass to be filled, a plate containing food residue, etc.

Recognition of and identification of an item will, in some embodiments, allow the assembly to determine one or more of a desired temperature T, a desired volume V, a desired flow rate R, a desired flow pattern FP, or a desired time period TP of water to be delivered to the item and deliver it.

In some embodiments, a flow pattern may for instance be a steady flow, for example to fill a pot, a measuring cup, a glass, etc. In other embodiments, a flow pattern may be a spray flow, for example to rinse a dirty plate, a dirty pot, etc.

In some embodiments, a present assembly may be configured to deliver untreated or treated water. The assembly may be configured to deliver untreated or treated water depending upon the item recognized; for example a glass or pot to be filled, or an item such as a plate, glass or pot to be cleaned.

In some embodiments, the one or more detectors are in electrical communication with a controller (microcontroller or circuit board) and the controller is in electrical communication with one or more electromechanical valves, for instance one or more solenoid valves. One or more solenoid valves may be associated with a hot water source, a cold water source, a treated water source, a liquid soap source, etc. The controller may be configured to receive information from the one or more detectors and to actuate (open or close) the one or more solenoid valves in response to the information. The one or more detectors together with a controller may be termed a "sensing system".

In some embodiments, the assembly may be configured to automatically deliver soap from the spray head upon a recognition of an item to be washed.

The one or more detectors, controller and solenoid valves are in electrical communication with a power source, for instance a battery, in some embodiments a rechargeable battery. Electrical communication may be via a wired or a wireless connection. An electrical wire may be disposed in a hose disposed in the spout, in some embodiments disposed between a hose cover layer and a fluid channel.

In some embodiments, the spray head, spout or faucet body may comprise one or more actuators selected from buttons, knobs, switches, etc., which may configured to activate or deactivate the one or more detectors (sensing system). In some embodiments, one or more actuators may be associated with and configured to actuate other features. In some embodiments, the one or more actuators may be in electrical communication with the sensing system.

In some embodiments, a spray head, spout, or faucet body may comprise an aperture configured to receive a further sensor, for example a presence sensor to determine a presence of a person. In some embodiments, a sensing system will not send instructions to actuate the assembly until it receives instructions from a presence sensor that a person is present. In some embodiments, an aperture may comprise a battery housing, a controller housing, an actuation feature, etc. A presence sensor may for example be an infrared sensor or a capacitive sensor. A presence sensor may allow an assembly to be "touchless".

In some embodiments, a sensing system may be "asleep" (in a sleep mode), and may be activated and placed in an active mode when a presence sensor sends a signal to a controller that a person is present. A presence sensor may be in electrical communication with a controller.

In some embodiments, a faucet assembly may be configured to be voice activated. For instance, a faucet assembly may comprise a microphone in electrical communication with a controller, and a sensing system will not send instructions to actuate the assembly until voice instructions are received. A sensing system may be in a sleep mode (deactivated), and placed in an active mode when an assembly receives a voice input.

In some embodiments, a faucet assembly may be configured to receive voice input, wherein the voice input may correspond to an item such as "measuring cup", "dirty dish", "dirty pot", "pot to be filled", etc. In some embodiments a voice input must be compared to and reconciled with information from a sensor positioned on a spray head face before a command will be carried out.

In some embodiments, the assembly may comprise a manual handle associated with a manual valve. In some embodiments, the assembly may be configured to deliver water upon operation of a handle associated with a manual valve and to override any instructions from the sensing system.

In some embodiments, a solenoid valve associated with a water source may be configured to be upstream of a manual valve.

Some faucet assemblies are described for example in U.S. patent app. Nos. 62/804,301, filed Feb. 12, 2019, and 62/848,221, filed May 15, 2019, and in U.S. Pat. No. 10,183,871.

FIG. 1 shows pull-down/pull-out faucet 100, according to one embodiment. Hose 101 is coupled to and in flow communication with spray head 104. In this figure, spray head 104 is docked to an end of spout 103. Spout 103 comprises an aperture 105, which may comprise a sensing feature, an actuation feature, battery housing, controller, etc. Hose 101 is disposed in spout 103, and upon extension of spray head 104 away from spout 103, will move in direction 102. Faucet 100 comprises manual handle actuator 106 coupled to a manual valve (not visible) disposed in faucet body 107. Faucet assembly 100 comprises a TOF sensor, a camera sensor, and image sensor, or a time-of-flight camera sensor 108 (not visible) positioned on a face of pull-down spray head 104.

Figure 2A:
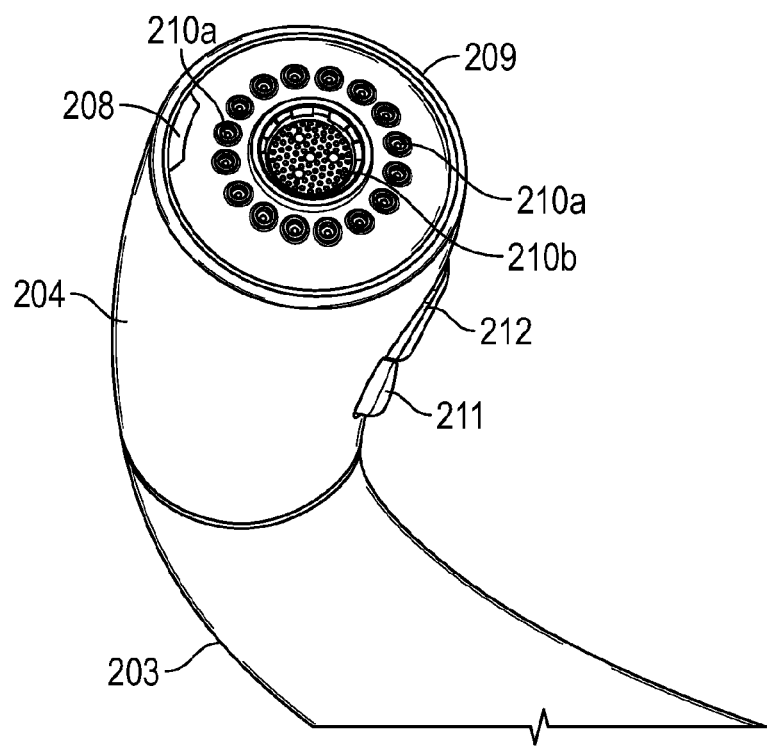
FIG. 2A depicts a spray head comprising a sensor, according to an embodiment.
Figure 2B:
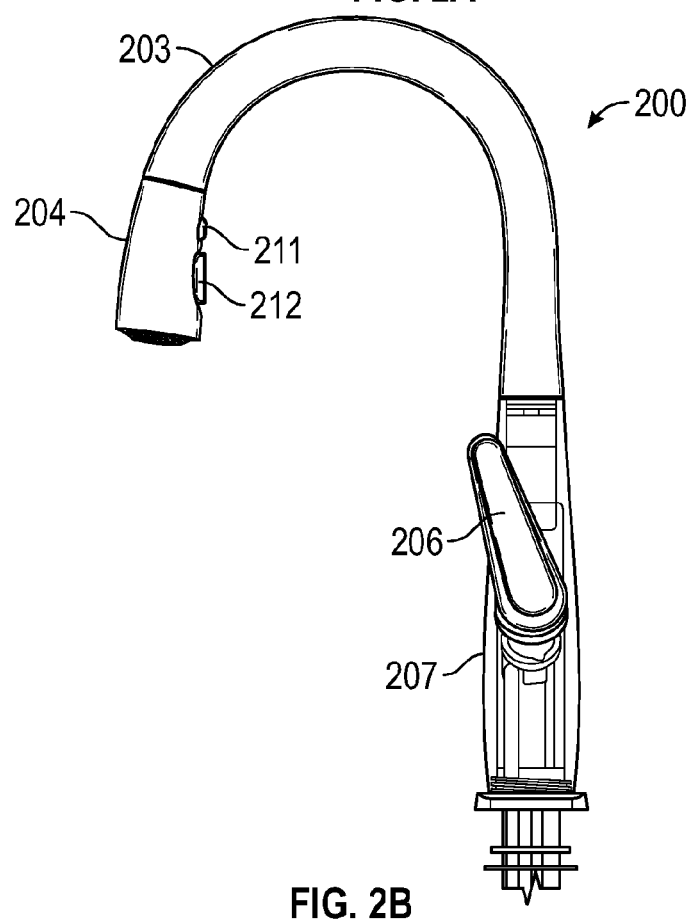
FIG. 2B depicts a faucet assembly, according to an embodiment.

FIG. 2A shows spray head 204 docked to spout 203 portion, from an underside perspective, according to an embodiment. Spray head face 209 comprises sensor 208, which sensor may be a TOF sensor, a camera sensor, an image sensor or a time-of-flight camera sensor. Spray head face 209 also comprises a plurality of nozzles 210a for delivering water in a spray fashion, as well as a center outlet 210b configured to deliver a conventional water stream. Spray head 204 comprises buttons 211 and 212, which buttons may be in electrical communication with for example sensor 208, one or more solenoid valves, or one or more further sensors. FIG. 2B depicts faucet assembly 200 comprising spray head 204 docked to spout 203. Spout 203 is coupled to faucet body 207. Manual handle 206 is positioned on body 207 and configured to control a mixing valve (not visible) positioned in faucet body 207.

Figure 3:
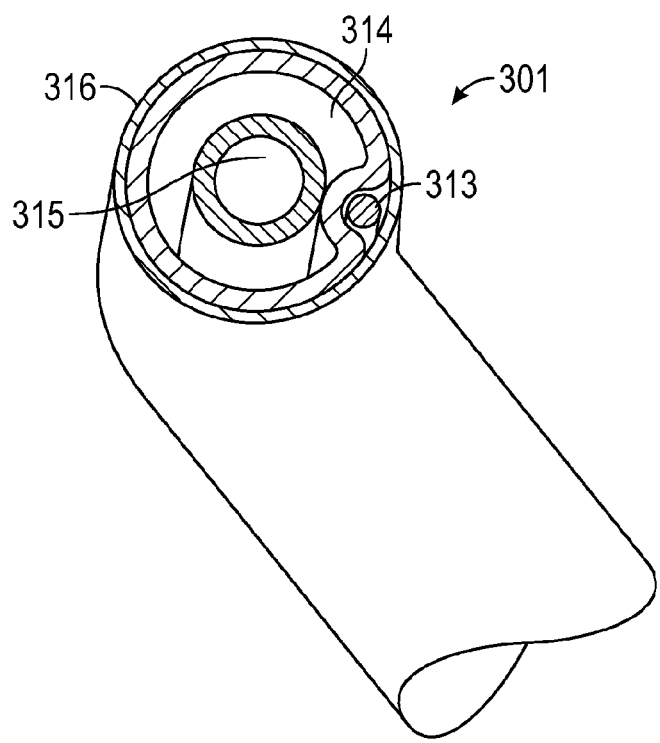
FIG. 3 depicts a cross-section of a multi-channel hose according to an embodiment.

FIG. 3 provides a cross-section view of multi-channel hose 301 according to an embodiment, having electric cable 313 disposed within it. Shown is channel 314 for delivery of untreated water to a spray head and channel 315 for delivery of for example treated water to a spray head. Also shown is cover layer 316, which layer may comprise braided nylon or stainless steel.

Figure 4:
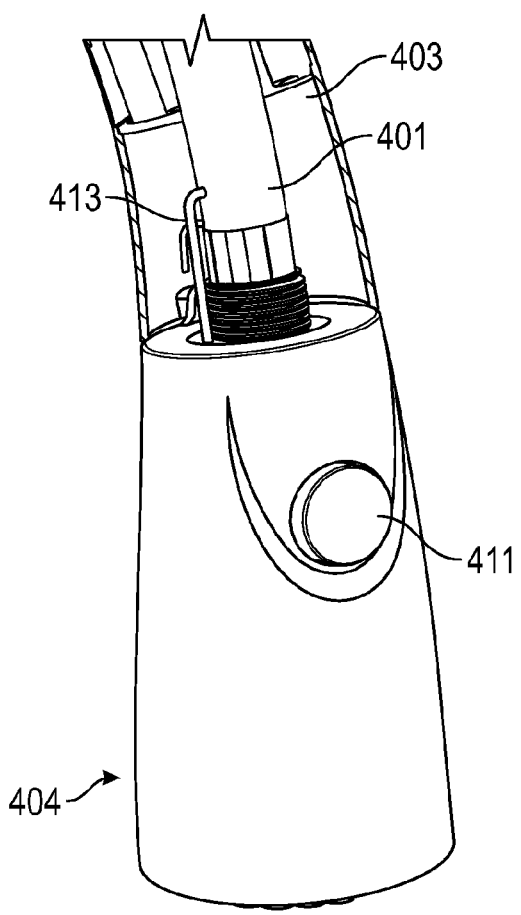
FIG. 4 displays a spray head with a cross-section of a spout according to an embodiment.

FIG. 4 shows spray head 404 according to an embodiment coupled to faucet spout 403 shown in cross-section. Visible in the spout cross-section are electric cable 413 exiting hose 401. Electric cable 413 is in electrical communication with electronic button 411 and may be disposed between a hose cover layer and a fluid channel.

Following are some non-limiting embodiments of the disclosure.

In a first embodiment, disclosed is a faucet assembly comprising a faucet body, a spout and a spray head, wherein the spray head comprises one or more detectors selected from a group consisting of time-of-flight sensors, camera sensors, image sensors, and time-of-flight camera sensors positioned on a face of the spray head, the spray head face defines a water flow path, and the one or more detectors are configured to recognize an item located in the water flow path.

In a second embodiment, disclosed is a faucet assembly according to the first embodiment, comprising a pull-down spray head. In a third embodiment, disclosed is a faucet assembly according to embodiments 1 or 2, wherein the one or more detectors are configured to recognize an item placed in a flow path when the item is from any of about 1 inch to about 24 inches from the spray head face. In a fourth embodiment, disclosed is a faucet assembly according to any of the preceding embodiments, wherein the spray head must be pulled out from the spout in order for the one or more detectors to recognize the item. In a fifth embodiment, disclosed is a faucet assembly according to any of the preceding embodiments, wherein when a spray head is pulled away from a spout, the detectors are activated and placed in an active mode from a sleep mode.

In a sixth embodiment, disclosed is a faucet assembly according to any of the preceding embodiments, wherein the one or more detectors are configured to recognize introduction of an item into the flow path, removal of an item from the flow path, or an identity of an item in the flow path.

In a seventh embodiment, disclosed is a faucet assembly according to any of the preceding embodiments, wherein the spray head comprises two or more detectors selected from a group consisting of time-of-flight sensors, camera sensors, image sensors, and time-of-flight camera sensors.

In an eighth embodiment, disclosed is a faucet assembly according to any of the preceding embodiments, wherein the assembly comprises a controller and one or more solenoid valves, and wherein the one or more detectors, the controller, and the one or more solenoid valves are in electrical communication.

In a ninth embodiment, disclosed is a faucet assembly according to any of the preceding embodiments, wherein two or more detectors are positioned on the spray head face.

In a tenth embodiment, disclosed is a faucet assembly according to any of the preceding embodiments, wherein the controller is configured to compare and reconcile information received from two or more detectors, and to recognize an item in the flow path based on the comparison and reconciliation.

In an eleventh embodiment disclosed is a faucet assembly according to any of the preceding embodiments, wherein a first detector is positioned on a spray head face, and a second detector is positioned on a faucet body.

In a twelfth embodiment, disclosed is a faucet assembly according to any of the preceding embodiments, wherein the item may be stationary or moving.

In a thirteenth embodiment, disclosed is a faucet assembly according to any of the preceding embodiments, comprising a presence sensor. In a fourteenth embodiment, disclosed is a faucet assembly according to any of the preceding embodiments, comprising a presence sensor positioned on a faucet body and a detector positioned on a spray head face. In a fifteenth embodiment, disclosed is a faucet assembly according to any of the preceding embodiments, wherein the item is not recognized unless the presence sensor indicates presence of a person.

In a sixteenth embodiment, disclosed is a faucet assembly according to any of the preceding embodiments, wherein the assembly comprises a microphone and is configured to receive and process voice input.

In a seventeenth embodiment, disclosed is a faucet assembly according to embodiment 16, configured so that an item is not recognized unless a controller compares and reconciles a voice command and information received from the one or more detectors. In an eighteenth embodiment, disclosed is a faucet assembly according to embodiments 16 or 17, wherein the one or more detectors are placed in an active mode from a sleep mode upon receiving a voice input.

In a nineteenth embodiment, disclosed is a faucet assembly according to any of the preceding embodiments, wherein the spray head is configured to deliver water upon introduction of an item in the water flow path. In a twentieth embodiment, disclosed is a faucet assembly according to any of the preceding embodiments, wherein the spray head is configured to cease water delivery upon removal of an item from the flow path.

In a twenty-first embodiment, disclosed is a faucet assembly according to any of the preceding embodiments, wherein the spray head is configured to deliver water at a temperature T, wherein temperature T depends upon an identity of the item recognized. In a twenty-second embodiment, disclosed is a faucet assembly according to any of the preceding embodiments, wherein the spray head is configured to deliver a volume of water V, wherein volume V depends upon an identity of the item recognized.

In a twenty-third embodiment, disclosed is a faucet assembly according to any of the preceding embodiments, wherein the spray head is configured to deliver a flow rate of water R, wherein flow rate R depends upon an identity of the item recognized. In a twenty-fourth embodiment, disclosed is a faucet assembly according to any of the preceding embodiments, wherein the spray head is configured to deliver a flow pattern of water P, wherein pattern P depends upon an identity of the item recognized.

In a twenty-fifth embodiment, disclosed is a faucet assembly according to any of the preceding embodiments, wherein the spray head is configured to deliver water for a time period TP, wherein TP depends upon an identity of the item recognized. In a twenty-sixth embodiment, disclosed is a faucet assembly according to any of the preceding embodiments, wherein the spray head is configured to deliver treated or untreated water, depending upon an identity of the item recognized.

In a twenty-seventh embodiment, disclosed is a faucet assembly according to any of the preceding embodiments, wherein a controller is configured to actuate one or more solenoid valves.

In a twenty-eighth embodiment, disclosed is a faucet assembly according to any of the preceding embodiments, wherein electrical communication is via a wired or a wireless connection.

In a twenty-ninth embodiment, disclosed is a faucet assembly according to any of the preceding embodiments, wherein the assembly comprises a first solenoid valve in flow communication with a cold water source and the spray head and a second solenoid valve in flow communication with a hot water source and the spray head.

In a thirtieth embodiment, disclosed is a faucet assembly according to any of the preceding embodiments, wherein the assembly comprises a third solenoid valve in flow communication with a water treatment assembly, for example water filter or ozone generator, and the spray head.

In a thirty-first embodiment, disclosed is a faucet assembly according to any of the preceding embodiments, wherein the assembly comprises an electronic actuator configured to activate or deactivate the one or more detectors, and place the one or more detectors in an active mode from a sleep mode.

In a thirty-second embodiment, disclosed is a faucet assembly according to any of the preceding embodiments, comprising a manual valve. In a thirty-third embodiment, disclosed is a faucet assembly according to embodiment 32, wherein manipulation of the manual valve, for example via a handle, deactivates the one or more detectors.

In a thirty-fourth embodiment, disclosed is a faucet assembly according to any of the preceding embodiments, wherein the spray head is configured to deliver soap upon introduction of an item in the flow path. In a thirty-fifth embodiment, disclosed is a faucet assembly according to any of the preceding embodiments, wherein the assembly comprises a solenoid valve in flow communication with a soap reservoir and the spray head.

When elements are configured to receive from or configured to deliver or provide fluid to another element, or when elements are coupled to other elements regarding fluid flow, the elements are in fluid or "flow" communication with each other. Likewise, elements configured to deliver or provide electrical signals are in "electrical" communication.

The terms "coupled" or "connected" may mean that an element is "attached to" or "associated with" another element. Coupled or connected may mean directly coupled or coupled through one or more other elements. An element may be coupled to an element through two or more other elements in a sequential manner or a non-sequential manner. The term "via" in reference to "via an element" may mean "through" or "by" an element. Coupled or connected or "associated with" may also mean elements not directly or indirectly attached, but that they "go together" in that one may function together with the other.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more. All numeric values are modified by the term "about" whether or not explicitly indicated. Numeric values modified by the term "about" include the specific identified value. For example "about 5.0" includes 5.0.

The term "substantially" is similar to "about" in that the defined term may vary from for example by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more of the definition; for example the term "substantially perpendicular" may mean the 90° perpendicular angle may mean "about 90°". The term "generally" may be equivalent to "substantially".

The term "towards" in reference to a of point of attachment, may mean at exactly that location or point or, alternatively, may mean closer to that point than to another distinct point, for example "towards a center" means closer to a center than to an edge.

The term "like" means similar and not necessarily exactly like. For instance "ring-like" means generally shaped like a ring, but not necessarily perfectly circular.

The articles "a" and "an" herein refer to one or to more than one (e.g. at least one) of the grammatical object. Any ranges cited herein are inclusive.

All U.S. patent applications, published patent applications and patents referred to herein are hereby incorporated by reference.

Features described in connection with one embodiment of the disclosure may be used in conjunction with other embodiments, even if not explicitly stated.

Embodiments of the disclosure include any and all parts and/or portions of the embodiments, claims, description and figures. Embodiments of the disclosure also include any and all combinations and/or sub-combinations of embodiments.

The invention claimed is:

1. A faucet assembly comprising
a faucet body, a spout, and a spray head; and
a sensing system comprising one or more detectors selected from a group consisting of time-of-flight sensors, camera sensors, image sensors, and time-of-flight camera sensors, and a controller in electrical communication with the one or more detectors,
wherein
the one or more detectors are positioned on a spray head face,
the spray head face defines a water flow path, and
the sensing system is configured to recognize introduction of an item into the flow path, recognize removal of an item from the flow path, and recognize an identity of an item in the flow path, wherein the controller is configured to determine and store a three-dimensional image of the item and to identify the item based on comparison to stored three-dimensional image.

2. The faucet assembly according to claim 1, comprising a pull-down spray head.

3. The faucet assembly according to claim 1, wherein the sensing system is configured to recognize an item placed in a flow path when the item is from any of about 1 inch to about 24 inches from the spray head face.

4. The faucet assembly according to claim 2, wherein the sensing system is activated upon the spray head being pulled out from the spout.

5. The faucet assembly according to claim 1, wherein the spray head comprises two or more detectors, and wherein the controller is configured to compare and reconcile information received from the two or more detectors, and to recognize the item based on the comparison and reconciliation.

6. The faucet assembly according to claim 1, wherein a first detector is positioned on a spray head face, and a second detector is positioned on a faucet body, and wherein the controller is configured to compare and reconcile information received from the first detector and the second detector, and to recognize the item based on the comparison and reconciliation.

7. The faucet assembly according to claim 1, comprising a presence sensor positioned on the faucet body, wherein the sensing system is activated upon the controller receiving a signal from the presence sensor indicating a person is present.

8. The faucet assembly according to claim 1, wherein the assembly comprises a microphone and is configured to receive and process voice input, and wherein the sensing system is activated upon receiving the voice input.

9. The faucet assembly according to claim 1, wherein the assembly comprises a microphone and is configured to receive and process voice input, and wherein the controller compares and reconciles a voice command and information received from the one or more detectors, and to recognize an item in the flow path based on the comparison and reconciliation.

10. The faucet assembly according to claim 1, wherein the item is not required to be stationary.

11. The faucet assembly according to claim 1, wherein the spray head is configured to deliver water upon introduction of an item in the water flow path, and to cease water delivery upon removal of an item from the flow path.

12. The faucet assembly according to claim 1, wherein the spray head is configured to deliver
water at a temperature T, and/or
a volume of water V, and/or
a flow rate of water R, and/or
a flow pattern of water P, and/or
water for a time period TP,
wherein the identity of the item recognized is determinate of temperature T, volume V, flow rate R, flow pattern P, and time period TP.

13. The faucet assembly according to claim 1, wherein the assembly comprises a water treatment assembly, and the spray head is configured to deliver treated or untreated water, depending upon the identity of the item recognized.

14. The faucet assembly according to claim 13, wherein the spray head is configured to deliver treated water selected from filtered water, ozone-infused water, NaOCl-infused water, electrolyzed water, and antimicrobial-infused water.

15. The faucet assembly according to claim 1, wherein the controller is in electrical communication with and configured to actuate one or more solenoid valves.

16. The faucet assembly according to claim 1, wherein electrical communication is via a wired or a wireless connection.

17. The faucet assembly according to claim 1, wherein the assembly comprises an electronic actuator configured to activate or deactivate the sensing system.

18. The faucet assembly according to claim 1, comprising a manual valve associated with a manual handle, wherein if the manual handle is actuated to open the manual valve, the sensing system is deactivated.

19. The faucet assembly according to claim 1, wherein the spray head is configured to deliver soap upon recognition of an item in the flow path.

20. The faucet assembly according to claim 1, wherein the assembly comprises a solenoid valve in flow communication with a soap reservoir and the spray head.

* * * * *